US011240187B2

(12) United States Patent
Dhawan et al.

(10) Patent No.: US 11,240,187 B2
(45) Date of Patent: Feb. 1, 2022

(54) COGNITIVE ATTACHMENT DISTRIBUTION

(71) Applicant: INTERNATIONAL BUSINESS MACHINES CORPORATION, Armonk, NY (US)

(72) Inventors: Yukti Dhawan, Panipat (IN); Abhishek Dhawan, Panipat (IN); Manjit Singh Sodhi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 16/774,393

(22) Filed: Jan. 28, 2020

(65) Prior Publication Data

US 2021/0234820 A1    Jul. 29, 2021

(51) Int. Cl.
*H04L 12/58* (2006.01)
*G06F 40/295* (2020.01)

(52) U.S. Cl.
CPC ............ *H04L 51/22* (2013.01); *G06F 40/295* (2020.01); *H04L 51/08* (2013.01)

(58) Field of Classification Search
CPC ... H04L 51/22; H04L 51/12; H04L 29/06408; H04L 41/026; H04L 65/4023; H04L 51/00; G06F 40/295; G06F 15/16; G06F 40/169; G06F 3/1231; G06F 9/265
USPC ........................................................ 709/206
See application file for complete search history.

(56) References Cited

U.S. PATENT DOCUMENTS

| | | | |
|---|---|---|---|
| 6,970,908 B1 | 11/2005 | Larky | |
| 7,716,217 B2 * | 5/2010 | Marston | G06Q 10/107 707/728 |
| 7,899,871 B1 * | 3/2011 | Kumar | G06Q 10/107 709/206 |
| 9,154,514 B1 * | 10/2015 | Prakash | H04L 51/12 |
| 9,282,073 B1 * | 3/2016 | Avital | H04L 51/26 |

(Continued)

FOREIGN PATENT DOCUMENTS

| | | | | |
|---|---|---|---|---|
| EP | 1461892 B1 | 10/2010 | | |
| KR | 20010014976 A | * | 2/2001 | H04L 51/08 |

OTHER PUBLICATIONS

Cuijpers et al., "Effectiveness and Acceptability of Cognitive Behavior Therapy Delivery Formats in Adults With Depression a Network Meta-analysis", 2019 (Year: 2019).*

(Continued)

*Primary Examiner* — Ondrej C Vostal
(74) *Attorney, Agent, or Firm* — John Noh

(57) ABSTRACT

A method, a computer program product, and a computer system cognitively distribute email attachments to recipients. The method includes receiving an email composition for an email to be transmitted to a plurality of recipients, the email composition including at least one attachment. The method includes determining recipient information indicative of respective characteristics of the recipients. The method includes determining a context of a select one of the at least one attachment. The method includes, for each recipient, determining a score indicative of an appropriateness of the selected attachment being distributed to the recipient based on the recipient information of the recipient and the context of the selected attachment. The method includes, as a result of the score for a select one of the recipients satisfying a scoring threshold, distributing the attachment to the selected recipient via the email.

17 Claims, 6 Drawing Sheets

(56) References Cited

U.S. PATENT DOCUMENTS

| | | | | |
|---|---|---|---|---|
| 9,467,401 | B1* | 10/2016 | Goldberg | H04L 63/1441 |
| 9,559,999 | B1* | 1/2017 | Auchmoody | G06Q 10/107 |
| 9,578,122 | B1 | 2/2017 | Lorenz | |
| 10,802,849 | B1* | 10/2020 | Trim | G06F 9/453 |
| 2002/0078158 | A1* | 6/2002 | Brown | H04L 65/605 |
| | | | | 709/206 |
| 2002/0107924 | A1* | 8/2002 | Walsh | G06Q 10/107 |
| | | | | 709/206 |
| 2005/0060643 | A1* | 3/2005 | Glass | G06F 40/169 |
| | | | | 715/205 |
| 2005/0188017 | A1* | 8/2005 | Ozaki | G06Q 10/10 |
| | | | | 709/206 |
| 2007/0050455 | A1 | 3/2007 | Yach | |
| 2007/0106736 | A1 | 5/2007 | Shepherd | |
| 2007/0168430 | A1 | 7/2007 | Brun | |
| 2007/0233788 | A1 | 10/2007 | Bender | |
| 2008/0071873 | A1 | 3/2008 | Gross | |
| 2008/0155006 | A1* | 6/2008 | Franklin | H04L 67/34 |
| | | | | 709/200 |
| 2009/0214034 | A1 | 8/2009 | Mehrotra | |
| 2010/0017476 | A1* | 1/2010 | Shue | G06Q 10/107 |
| | | | | 709/206 |
| 2010/0077041 | A1* | 3/2010 | Cowan | G06F 15/16 |
| | | | | 709/206 |
| 2010/0223341 | A1* | 9/2010 | Manolescu | H04L 51/063 |
| | | | | 709/206 |
| 2011/0252027 | A1* | 10/2011 | Chen | G06F 16/335 |
| | | | | 707/728 |
| 2011/0302251 | A1* | 12/2011 | Meunier | G06F 15/16 |
| | | | | 709/206 |
| 2012/0240053 | A1* | 9/2012 | Shriber | G06F 16/951 |
| | | | | 715/749 |
| 2012/0284070 | A1* | 11/2012 | Sork | G06Q 10/06 |
| | | | | 705/7.11 |
| 2013/0325991 | A1* | 12/2013 | Chambers | H04L 51/12 |
| | | | | 709/206 |
| 2014/0236986 | A1* | 8/2014 | Guzman | G06F 16/24522 |
| | | | | 707/769 |
| 2015/0120842 | A1 | 4/2015 | Huggins | |
| 2015/0170209 | A1* | 6/2015 | Smith | G06Q 30/0267 |
| | | | | 705/14.64 |
| 2015/0236995 | A1* | 8/2015 | Hammer | H04L 51/28 |
| | | | | 709/206 |
| 2015/0264111 | A1 | 9/2015 | Aleksandrov | |
| 2015/0323337 | A1* | 11/2015 | Aiello | G06N 7/005 |
| | | | | 701/533 |
| 2016/0225063 | A1* | 8/2016 | Wical | G06Q 30/0641 |
| 2017/0192950 | A1* | 7/2017 | Gaither | G06F 9/453 |
| 2017/0206545 | A1* | 7/2017 | Gupta | H04L 51/12 |
| 2018/0091453 | A1* | 3/2018 | Jakobsson | H04L 51/12 |
| 2018/0137402 | A1* | 5/2018 | Bar | G06N 3/006 |
| 2018/0191652 | A1* | 7/2018 | Goel | H04L 51/16 |
| 2018/0219820 | A1* | 8/2018 | Kramer | G06Q 30/0248 |
| 2018/0359280 | A1* | 12/2018 | Elworthy | H04L 63/1408 |
| 2019/0050406 | A1* | 2/2019 | Nguyen | G06F 16/24535 |
| 2019/0065742 | A1* | 2/2019 | Humphries | G06F 21/121 |
| 2020/0110764 | A1* | 4/2020 | Pollak | G06F 16/287 |
| 2020/0293933 | A1* | 9/2020 | Ghosh | H04L 67/10 |

OTHER PUBLICATIONS

Hirano et al., "Advertisement Circulating Passage Analyzing Method, Its Implementation System and Its Processing Program", JP 2004171042 A, 2004 (Year: 2004).*
Melnikov et al., "Internet Message Access Protocol (IMAP)—Version 4rev2", RFC 9051, 2021 (Year: 2021).*
Merriam-Webster, "cognitive", 2021 (Year: 2021).*
Moore et al., "Cleartext Considered Obsolete: Use of Transport Layer Security (TLS) for Email Submission and Access", RFC 8314, 2018 (Year: 2018).*
SendGrid, "What is an SMTP Server?", 2019 (Year: 2019).*
https://support.yet-another-mail-merge.com/hc/en-us/articles/210735349 . . . ,"Send a mail merge with personalized attachments to each recipient", printed Sep. 7, 2019, pp. 1-3.
IBM, "Email Recipient Specific Content", IP.com No. IPCOM000189163D, Oct. 30, 2009, pp. 1-3.
IBM, "Selective Generation of Email Attachments", IP.com No. IPCOM000161000D, Dec. 6, 2007, pp. 1-6.
Koren et al., "Method and System for Sending Distinct Portions of Email Content to Different Recipients", IP.com No. IPCOM000222795D, Oct. 23, 2012, pp. 1-5.
Mell et al., "The NIST Definition of Cloud Computing", National Institute of Standards and Technology, Special Publication 800-145, Sep. 2011, pp. 1-7.

* cited by examiner

COGNITIVE ATTACHMENT DISTRIBUTION

BACKGROUND

The exemplary embodiments relate generally to attachments in emails, and more particularly to determining proper recipients and distributing an attachment to the proper recipients that is included in an email.

An email may be sent to a plurality of recipients and may include an email body and one or more attachments. In a conventional email client, a user may identify the recipients that are to receive the email and attach files as attachments to the email. In transmitting the email, each recipient that is entered (e.g., in the "To", "CC", and/or "BCC" field) receives the email body and all attachments that are included. However, there are many times that the user may need to send an email to multiple recipients using a common email body but the attachments are to be selectively distributed among the recipients (e.g., due to issues related to confidentiality, relevance, etc.). In view of the conventional mechanism that transmits the email including the email body and all attachments to each listed recipient, the user is required to compose multiple emails so that the proper attachments are being sent to the corresponding recipients. This leads to an increased amount of time and effort spent in writing the same text for different recipients in separate emails simply to attach separate files so that recipients only receive files that they are authorized to view. Similarly, if an attachment is more relevant to a sub-group of the recipients, sharing the attachment with the entire group of recipients result in consuming extra storage space in mailboxes for irrelevant files and utilizing additional time of the recipients for which the attachment is less relevant.

SUMMARY

The exemplary embodiments disclose a method, a computer program product, and a computer system for cognitively distributing email attachments to recipients. The method comprises receiving an email composition for an email to be transmitted to a plurality of recipients, the email composition including at least one attachment. The method comprises determining recipient information indicative of respective characteristics of the recipients. The method comprises determining a context of a select one of the at least one attachment. The method comprises, for each recipient, determining a score indicative of an appropriateness of the selected attachment being distributed to the recipient based on the recipient information of the recipient and the context of the selected attachment. The method comprises, as a result of the score for a select one of the recipients satisfying a scoring threshold, distributing the attachment to the selected recipient via the email.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
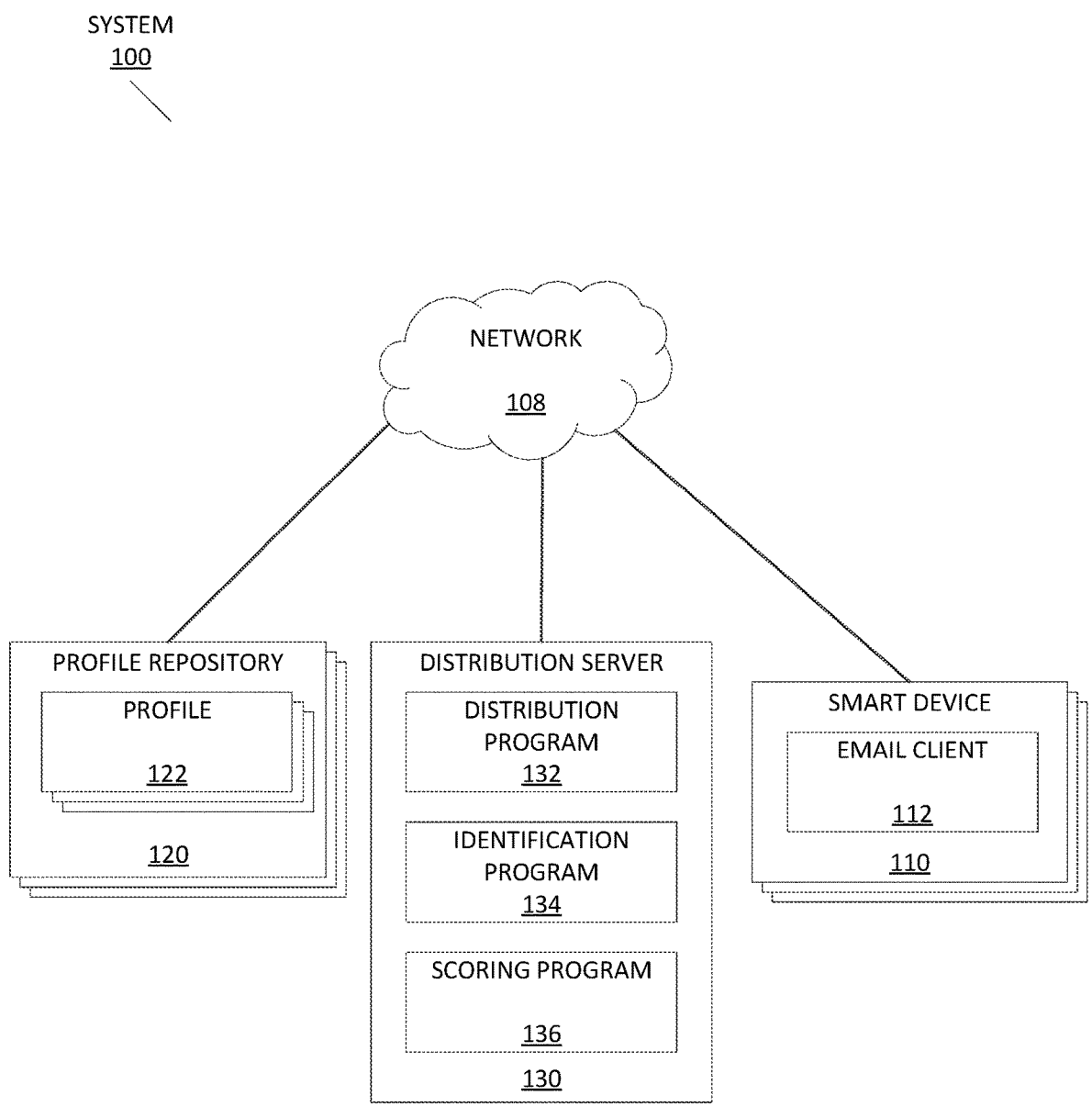
FIG. 1 depicts an exemplary schematic diagram of an attachment distribution system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for cognitively distributing email attachments to recipients in which a single email from a user may be transmitted to all the recipients where each recipient only receives selected one or more attachments determined to be appropriate for receiving. As will be described in greater detail herein, the exemplary embodiments are configured to process an email composition including any attachments to identify which of the recipients that are included in the email composition as well as any potential forgotten recipients are to receive the attachments. The exemplary embodiments provide a mechanism to process the email composition to determine which of the attachments are to be distributed to the recipients. Based on identifying the recipients and the appropriate attachments that each recipient is to receive, the exemplary embodiments may transmit the email to the recipients such that each recipient only receives the indicated and/or determined appropriate attachments. Key benefits of the exemplary embodiments may include a capability for a single email composition to allow for specific attachments to be received by each recipient that provides a more efficient manner of attachment distribution for both the sender and receiver of the email. Detailed implementation of the exemplary embodiments follows.

Conventional approaches to distributing attachments of an email to recipients may involve an all or nothing approach or may incorporate a manual selection process. For example, a conventional approach utilizing conventional email clients may entail a user to create an email composition by including a list of recipients of the email, entering an email body, and attaching files to the email. Thereafter, upon transmitting the email, each listed recipient receives the email body and all the files that are attached. If certain recipients are not to receive one of the more of the attachments, the user is required to not attach the files and may instead send a separate email that includes the appropriate attachments for each recipient. Accordingly, the conventional email clients do not allow a single email to selectively distribute appropriate attachments. In another example, a conventional approach may allow a user composing the email to manually select recipients who are to receive specific attachments that are included in the email. In this manner, each recipient may receive an email with recipient specific selected attachments. In one conventional approach of manually selecting recipients for attachments of an email, a user may identify a group of individual to receive one or more attachments of the email such that a corresponding conventional system generates the email that is sent to each recipient with the recipient specific attachments. In a second approach of manually selecting recipients for attachments of an email, a user may specify which recipients are to receive certain attachments and/or message body content of the email body through specialized data blocks or other designators placed in the message by a manual selection process. However, this approach of selecting recipients for attachments will always require the user to provide an indication that associates an attachment to a recipient for distribution via the email.

In contrast to conventional approaches, the exemplary embodiments may provide an automated mechanism to determine appropriate attachments to be distributed to recipients of an email. The exemplary embodiments provide a user with a functionality to for recipients to be selected from a mailing list (e.g., a list of recipients) to receive select attachments so that the user is only required to compose one email body, add the files as attachments to the email that are to be distributed to the recipients as a whole, and transmit the email so that each recipient receives only appropriate attachments. In this manner, the user may save time and effort by avoiding a repetitive process of composing and sending multiple emails with a similar email body having respective selected attachments for which the user manually selects the corresponding recipients. For example, a manager may need to transmit increment letters to multiple team members as an attachment in an email. The increment letters may be personal to each team member, but a similar email body may be used in each email. Rather than having to compose an individual email for each team member and attaching the personal increment letter of the team member, the exemplary embodiments may compose a single email and attach all of the increment letters in the single email such that the exemplary embodiments determine the manner in which the attachments are to be distributed to the team members. In another example, a CEO may share an annual message via a single email with all company employees in an email body. The CEO may also attach very detailed sales data in the email. However, the sales data may only be useful or relevant to sales team employees while other employees may only require a broad overview. Thus, sharing the sales data may consume mailbox space for the other employees. The exemplary embodiments may prevent this unnecessary consumption of mailbox space for the other employees through a cognitive distribution of the sales data to only the sales team employees. The exemplary embodiments may also provide a feature in using natural language processing (NLP) techniques to build a classifier to make more accurate automatic recommendations of specific recipients for specific attachments considering appropriateness standards. With each use, the classifier may learn and improve recommendations using machine learning techniques.

Accordingly, the exemplary embodiments may provide a plurality of benefits for the user transmitting emails as well as to the recipients. For example, the exemplary embodiments may distribute specific attachments to recipients based on each recipient's confidentiality, relevance, or other appropriateness standard when the user only transmits one email with all attachments included together. In another example, the exemplary embodiments avoid possible additional recipients to already mentioned recipients and all attachments going to all recipients instead of specific attachments based on access level, relevance, etc. In a further example, the exemplary embodiments may bypass a use of setting an access level and utilizing relevance metadata by storing an attachment in a centralized database and sharing only a link in the email for an attachment. In yet another example, the exemplary embodiments may streamline an attachment distribution process that is dynamic, particularly when new attachments are included in the single email. Every new attachment may not be required to be stored in a centralized database manually that requires an access to be set which takes additional time and mailbox space in an email repository of the email system.

The exemplary embodiments are described with regard to processing an email composition in determining how attachments are to be distributed to the recipients based on whether the attachments are appropriate for the recipient to receive. However, the exemplary embodiments may be utilized in any distribution environment in which a single composition intended for a plurality of recipients is processed to determine how portions of the composition are to be received based on an appropriateness standard. The exemplary embodiments are also described with regard to a user creating the email composition and the recipients being further users. However, the exemplary embodiments may also be configured to be utilized with non-user components that are analogous to the user creating the email composition and/or the recipient receiving the email. For example, a system may be configured to automatically generate and transmit an email to a list of recipients at a predetermined time (e.g., a quarterly results assessment at the conclusion of a quarter). The exemplary embodiments may be configured to select how attachments that may be included in the email from the system to be distributed to the recipients. The exemplary embodiments are also directed toward an email in which there is a plurality of recipients at least one attachment. However, those skilled in the art will appreciate that the exemplary embodiments may also be used when there is only one recipient (e.g., determining that an attachment that is included should be included for the recipient).

FIG. 1 depicts an attachment distribution system 100, in accordance with the exemplary embodiments. According to the exemplary embodiments, the attachment distribution system 100 may include one or more smart devices 110, one or more profile repositories 120, and a distribution server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the attachment distribution system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the attachment distribution system 100 that do not utilize the network 108.

In the exemplary embodiments, the smart device 110 may include an email client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the email client 112 may act as a client in a client-server relationship and may be a software, hardware, and/or firmware based application capable of allowing a user to compose an email to be transmitted to recipients via the network 108. In embodiments, the email client 112 may operate as a user interface allowing the user to create an email composition as well as interact with one or more components of the attachment distribution system 100, and utilize various wired and/or wireless connection protocols for data transmission and exchange associated with cognitively distributing email attachments to recipients, including Bluetooth, 2.4 gHz and 5 gHz internet, near-field communication, Z-Wave, Zigbee, etc.

The user may utilize the email client 112 to create the email composition where the email composition may include one or more types of recipient fields (e.g., To, CC, and BCC) in which the user may enter email addresses corresponding to recipients of the email, may add a title of the email indicating a subject for which the email is being sent, may add an email body including text, links, images, etc. to be conveyed to the recipients, and may attach files to be distributed to the recipients. According to the exemplary embodiments and as will be described in further detail below, the user may compose a single email and include all recipients and all attachments for which the email is to be sent, despite the attachments intended to be distributed in a selective manner (e.g., to a sub-group or individual recipients). Using the exemplary embodiments, prior to transmitting the email to the recipients, the attachment distribution system 100 may determine the manner in which the single email from the user is to be transmitted such that only appropriate attachments are distributed to each recipient. In providing this feature and to be discussed below, the email client 112 may include one or more operations that are performed in cooperation with the distribution server 130.

Each of the recipients may also utilize a respective smart device 110 and access emails that are received via the email client 112. The email client 112 may provide a prompt or indication to the recipients of a newly received email. The recipients may utilize the user interface of the email client 112 to open the email and view the sender of the email, view the recipients of the email for those not hidden, view the title, view the email body, and access any attachments that may be included. Again, as will be described below, each recipient may only receive attachments that are determined to be appropriate for the respective recipient.

In the exemplary embodiments, the profile repository 120 may include one or more profiles 122 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 120 is shown as a single device, in other embodiments, the profile repository 120 may be comprised of a cluster or plurality of electronic devices, in a modular manner, etc., working together or working independently. While the profile repository 120 is also shown as a separate component, in other embodiments, the profile repository 120 may be incorporated with one or more of the other components of the attachment distribution system 100. For example, the profile repository 120 may be incorporated in the distribution server 130. Thus, access to the profile repository 120 by the distribution server 130 may be performed locally. In another example, the profiles 122 represented in the profile repository 120 may be incorporated in respective ones of the smart device 110 (e.g., each smart device 110 has a profile repository 120 including at least the profile 122 of the recipient who is respectively associated). Thus, access to the profile repository 120 and to a specific one of the profiles 122 may be performed through a transmission from the smart device 110. The profile repository 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the profiles 122 may be associated with the user sending the email and the respective recipients who may receive the email composed by the user. The profiles 122 may be populated with various types of information that may be used in determining an appropriateness of whether an attachment is to be distributed to the recipients. For example, when the email is being transmitted between members of a corporation, the profiles 122 may include information indicating a job title, a department in which the user or recipient belongs, a current status (e.g., active, inactive, prospective, retired, etc.), responsibilities of the job position, projects on which the user and/or recipients are a part currently and/or historically, a reporting hierarchy, other information included in human resource sources, etc. In another example, the profiles 122 may include information indicative of expertise, knowledge, coursework, interest, etc. in various fields, technical and/or non-technical. The technical expertise may be, for example, a technical discipline, a scientific practice, etc. The non-technical expertise may be, for example, organizational skills, leadership, public speaking, etc. In a further example, the profiles 122 may include historical email exchange information that indicates inclusion and/or exclusion of the user and/or the recipients in other email exchanges that may be relevant to the current email being composed.

In the exemplary embodiments, the distribution server 130 may include a distribution program 132, an identification program 134, and a scoring program 136 and act as a server in a client-server relationship with the email client 112 as well as be in a communicative relationship with the profile repository 120. The distribution server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the distribution server 130 is shown as a single device, in other embodiments, the distribution server 130 may be comprised of a cluster or plurality of computing devices, working together or working independently. While the distribution server 130 is also shown as a separate component, in other embodiments, the operations and features of the distribution server 130 may be incorporated with one or more of the other components of the attachment distribution system 100. For example, the operations and features of the distribution server 130 may be incorporated in the smart device 110, particularly the smart device 110 of the user who is sending the email. The distribution server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the distribution program 132 may be a software, hardware, and/or firmware application configured to transmit an email composed by the user to a plurality of recipients utilizing distribution information indicative of selecting attachments among attachments that are included in the email for each recipient. The distribution program 132 may receive the information as a manual indication from the user and/or a determined indication as determined by the distribution server 130. Accordingly, based on the distribution information, the distribution program 132 may distribute the attachments such that each recipient only receives appropriate attachments based on various appropriateness standards which will be described in further detail below.

In distributing the email along with the attachments included in the email, the attachment distribution system 100 may utilize additional components (not shown) that perform respective functionalities in completing the email transmission. For example, the attachment distribution system 100 may include a simple mail transfer protocol (SMTP) server and a domain name system (DNS) server. The email account of the user sending the email may be associated with the SMTP server such that any email being transmitted is received by the SMTP server. The user's SMTP server may be located and/or identified utilizing the DNS server. In another example, the attachment distribution system 100 may include an Internet message access protocol (IMAP) server and/or a version of a post office protocol (POP) server such as a POP3 server. Upon transmitting the email, the recipients may access any email via a respective IMAP and/or POP3 server via the email client 112. As the email is received by the recipients with only the appropriate attachments, the recipients may access only those files for which the recipients are authorized. Those skilled in the art will understand that the attachment distribution system 100 may include further components that may contribute in the transmission and reception of an email as well as accessing attachments included in the email. The exemplary embodiments may utilize, for example, the above described components but such operations under the exemplary embodiments will be described herein with general terms related to transmission and reception of the email and/or attachments.

In a first manner of selecting attachments for each recipient among all the attachments that are included in the email composition created by the user, the email client 112 may provide a feature in the user interface in which the user may manually select the attachments that are authorized for viewing by each recipient. In a first manner, the email client 112 may be configured to present the feature in the user interface for each time that the user creates an email composition. In a second manner, the email client 112 may receive a request from the distribution program 132 that the feature in the user interface be presented to the user. The email client 112 and/or the email account of the user may include settings in which the user may select that the manual selection process is to be used. As will be described below, the settings may also allow the user to select that an automated selection process be used when the attachments may be processed by the distribution server 130. Under the first manner of manually selecting the attachments, when the email client 112 has received the corresponding inputs from the user, the email client 112 may format and generate the distribution information which is then provided to the distribution program 132.

In a second manner of selecting attachments for each recipient among all the attachments that are included in the email composition created by the user, the user may create the email composition via the email client 112. The distribution server 130 may receive the email composition including all the attachments that have been included. As will be described below, the identification program 134 and the scoring program 136 may perform respective operations to generate and provide the distribution information to the distribution program 132 without user intervention. Therefore, under the second manner of automatically selecting the attachments, the distribution program 132 may receive the distribution information from the identification program 134 and the scoring program 136 through an automated processing of the attachments and correlation to the recipients that are listed in the email composition and may alternatively also determine recipients that may not be listed, omitted, or forgotten by the user creating the email composition.

When the distribution program 132 has received the distribution information through the first manner of a manual selection and/or through the second manner of an automated selection, the distribution program 132 may be configured to transmit the email to each recipient. For example, according to an exemplary embodiment, the distribution program 132 may encode multiple emails corresponding to each recipient with the same email body but with specific files to be attached based on the distribution information so that each recipient only receives the files that the recipient is authorized to receive from the user. In another example, according to another exemplary embodiment in which the email system may be configured in a different manner, the distribution program 132 may encode a single email that is to be transmitted to each recipient using the email body but opening of the email by each recipient results in only specific files being accessible.

In the exemplary embodiments, the identification program 134 may be a software, hardware, and/or firmware application configured to identify recipients and characteristics of the recipients that form the basis upon which attachments are selected for authorized reception. The identification program 134 may have access to the profiles 122 in the profile repository 120 to receive listed characteristics as well as determine characteristics implied from the listed characteristics. The identification program 134 may generate recipient information describing the characteristics of each recipient. The identification program 134 may provide the recipient information to the scoring program 136 for further processing directed toward the automated selection of the attachments for the recipients.

The above mechanism of the identification program 134 may relate to the recipients that are listed in the email composition. As the recipients listed in the email composition are based on a manual entry by the user, the identification program 134 may accept that the listed recipients are all intended to receive the email. However, the identification program 134 may also be configured to determine if one or more of the listed recipients may have inadvertently been included based on the email composition and the recipient information. The identification program 134 may further be configured to determine whether a recipient may have been omitted in the email composition. For example, the identification program 134 may perform a pre-processing of the email body and use natural language processing (NLP) techniques to identify names in the email body. If the name does not have a corresponding email address listed among the recipients, the identification program 134 may include an additional recipient as an automated process or request confirmation of such an addition. In another example, the identification program 134 may pre-process the email body, the attachments, and the recipient list and identify team members who may have been omitted. Accordingly, the identification program 134 may include an additional recipient as an automated process or request confirmation of such an addition. Through the various identification operations, the identification program 134 may provide the recipient information to the scoring program 136.

In the exemplary embodiments, the scoring program 136 may be a software, hardware, and/or firmware application configured to receive the recipient information and perform operations that determine specific attachments that are authorized for receiving by each recipient. Initially, the scoring program 136 may process the title and/or the email body to determine a general scope of the email to be transmitted. For example, the scoring program 136 may use NLP and/or machine learning to determine the scope of the email. The scoring program 136 may also identify file types of the files that are attached to the email. As those skilled in the art will understand, conventional techniques may only enable certain file types to be processed to determine a context and/or characteristics of the attachment. For example, files that may allow for optical character recognition (OCR) operations to be performed may be processable. The files may include those having certain extensions (e.g., doc, docx, txt, ppt, pdf, etc.). Other files that do not allow for OCR operations may not be processable for purposes of the exemplary embodiments. The files may include those having other extensions (e.g., zip, tar.gz, crt, pem, image file extensions, etc.). However, the scoring program 136 may still be configured to ascertain select characteristics of the files that are not considered processable. For example, the scoring program 136 may process a name of the file (e.g., the portion of the name of the file preceding the extension). If the scoring program 136 is configured with further types of processing capabilities (e.g., image processing), the scoring program 136 may process files that correspond to the further types of processing capabilities.

For files that are attached which are not processable to a degree that allows a proper scoring in automatically determining how the attachment is to be distributed among the recipients, the scoring program 136 may mark such files. The scoring program 136 may generate an indication for these attachments which is received by the distribution program 132. In a substantially similar manner to when the settings are configured for a manual selection to be used for each attachment, the distribution program 132 may request that the user provide a manual selection via the email client 112 with regard to the manner in which these attachments are to be distributed to the recipients.

For files that are attached which are processable, the scoring program 136 may process the file and prepare the file for NLP. According to an exemplary embodiment, the scoring program 136 may be configured with NLP processing. In another exemplary embodiment, the attachment distribution system 100 or the distribution server 130 may include a component configured with NLP processing. In the exemplary embodiment where the scoring program 136 is configured with NLP processing, the scoring program 136 may segment text, remove stop words, perform part of speech tagging, chunk text, etc. Through the NLP processing, the scoring program 136 may determine a context of the file. The NLP processing may include NLP classifiers that are already trained on similar documents. For example, using NLP processing, the scoring program 136 may determine that an attachment may be an offer letter, an increment letter, a promotion letter, etc. In an exemplary process performed by the scoring program 136, the scoring program 136 may determine that an attachment is of a type in which only one recipient is addressed (e.g., an offer letter, an increment letter, etc.). The scoring program 136 may extract the name using NLP of the recipient from the document and determine an identity of the recipient for which the attachment is to be distributed while other recipients are to be excluded from having this attachment distributed. Thus, if the recipient is included in the list of recipients of the email composition, the scoring program 136 may generate distribution information that the identified recipient is to receive the attachment. In another exemplary process performed by the scoring program 136, the scoring program 136 may determine that an attachment is of a type in which multiple recipients may be addressed (e.g., an annual sales report shared with an entire sales team). The scoring program 136 may utilize NLP to find a group of recipients which this attachment was previously shared (e.g., as indicated in the recipient information provided by the identification program 134) and identify these recipients among the recipients of the email composition. The scoring program 136 may generate distribution information that the identified recipients are to receive the attachment.

The automated selection of the manner in which an attachment is distributed may be completed according to an automated determination or a manual confirmation. For example, if the automated selection is chosen for use, the user may specify (e.g., the email account settings) that the determinations are to be applied. In another example, the user may specify that any determination is to be provided as a recommendation so that the user may confirm or decline each recommendation. Accordingly, whenever the automated selection process is used and the distribution server 130 determines the manner in which one or more attachments included in the email composition are to be distributed among the recipients, the distribution server 130 (e.g., via the distribution program 132) may generate a recommendation to be viewed on the user interface of the email client 112. The user may respond to the distribution server 130 with regard to the recommendations.

As described above, the scoring program 136 may determine a score indicating whether an attachment is to be distributed to a specific recipient. The scoring program 136 may utilize a scoring threshold such that a score between an attachment and a recipient must satisfy the scoring threshold for the recipient to be authorized in receiving the attachment. For example, the scoring program 136 may utilize a scale from 1 to 10 where 1 is least appropriate and 10 is most appropriate. The scoring threshold may be set based on a variety of different standards and the scoring program 136 may utilize different scoring threshold according to the different contexts that may exist in email transmissions. In an illustrative embodiment, the scoring program 136 may use a universal scoring threshold applicable to any email transmission and attachment. The scoring program 136 may set the scoring threshold according to a majority basis. For example, the scoring threshold may be set to 5. Thus, any time that a score between an attachment and a recipient is at least 5, the scoring program 136 may determine that the attachment is appropriate for the recipient. In another example, the scoring program 136 may set the scoring threshold according to a stricter basis such as setting the scoring threshold to 7. Those skilled in the art will appreciate the various degrees in which a scoring threshold may be set.

In determining the score between an attachment and a recipient, the scoring program 136 may utilize a plurality of different standards for appropriateness. The scoring program 136 may assign a score between an attachment and a recipient that reflects a relevance or appropriateness for the attachment to be distributed to the recipient. A higher score may be indicative that the attachment is to be distributed to the recipient whereas a lower score may be indicative that the attachment is to not be distributed, although various other scoring schemes may also be utilized within the scope of the exemplary embodiments.

According to an exemplary scoring scheme, the scoring program 136 may determine recipients who are to receive an attachment through a mechanism described above using NLP and machine learning techniques. The scoring program 136 may assign a score between 1 to 10 where 1 is least relevant/appropriate and 10 is most relevant/appropriate. The scoring program 136 may also determine if any required authorizations are complete for an attachment that may be needed before distributing the attachment to specific recipients. The scoring program 136 may use a standard where greater approvals may equate to a higher relevance. As described above, the scoring program 136 may receive recipient information from the identification program 134 that is based on data from sources such as human resources databases to determine skills of recipients and determine how much of a context of an attachment is relevant/appropriate to the skills of the recipient. Based on the recipient information, the scoring program 136 may similarly receive recent training information for which recipients have attended to assign a score for an attachment if the context of the attachment is similar to the recent training session attended by the recipient. The scoring program 136 may additionally maintain records of recent websites that have been visited in the email and assign a score based on the historical visitation information.

According a scoring implementation, the scoring program 136 may determine relevance and/or appropriateness based on timing and/or authorization. The scoring program 136 may consider that content being extracted from the attachment as well as whom the attachment is addressed provides a partial basis upon which to determine the score. Accordingly, the scoring program 136 may also determine an authorization of whether the attachment is to be distributed to a recipient. For example, in the case of an attachment being an offer letter, prior to distribution of the offer letter to the intended recipient for which the offer letter is addressed, there may be select individuals who must first provide approval (e.g., a CEO, a manager, etc.). In the case where two individuals must provide approval, a first individual may have approved the offer letter while the second individual is being reached for approval. The scoring program 136 may use NLP and machine learning techniques to suggest that the potential employee for which the offer letter is addressed to be included in the email as a recipient. However, without the second individual's approval, the offer letter being sent to the addressed potential employee will be premature. The scoring program 136 may therefore be configured to determine the timing and authorization of attachments for recipients who are listed in the email composition as well as potential recipients. For example, the scoring program 136 may determine that the second individual must first receive the offer letter in the sequence and receive the proper approval for the addressed potential employee to be authorized in receiving the offer letter. In performing this determining, the scoring program 136 may use, for example, NLP in determining an authorization classifier (e.g., based on historical data such as previous approval emails, information of an email body such as an explicit mention related to authorization, etc.) and/or a timing classifier (e.g., based on historical data such as a pattern of emails within a predefined time duration, information of an email body such as an explicit mention in an email indicating whether an attachment is to be sent or not sent, etc.).

According another scoring implementation, the scoring program 136 may utilize a scaling in determining relevance and/or appropriateness between an attachment and a recipient. A manual process of selecting which attachment is to be distributed to which recipient quickly becomes tedious, particularly when a number of attachments and a possible number of recipients increase. For example, a manager working with large teams across various geographies may need to transmit increment letters via email. Under the manual selection process, the manager would be required to write separate emails and/or manually select a large number of recipients. The exemplary embodiments may be configured to automatically determine the correct recipients and may be scaled to any number of recipients and attachments.

According a further scoring implementation, the scoring program 136 may determine relevance and/or appropriateness based on characteristics of the recipients as may be indicated in the profiles 122 for the recipients. The scoring program 136 may consider skills, trainings that have been attended, interests based on a planned career path, etc. using data from the profiles 122 and may determine appropriate attachments to distribute to recipients. For example, an employee may work on a cloud engineering team and attend trainings recently on machine learning to move further on a planned career path. Accordingly, cloud and machine learning related parts of an email body and attachments may be given a higher score for the employee.

According yet another scoring implementation, the scoring program 136 may determine relevance and/or appropriateness based on recent interests. For example, an employee may have cloud engineering skills and have attended machine learning training sessions recently. However, the employee may be interested in management training based on other sources (e.g., a browser history). This information from the sources may be fetched (e.g., assuming proper authorization, proper anonymity protocols are used for user privacy, etc.). In this manner, the scoring program 136 may determine that management and/or leadership related attachments may be given a higher score for this employee.

The scoring program 136 may generate an overall score based on the various factors described above with regard to determining relevance and/or appropriateness of an attachment for a given recipient. For example, the scoring program 136 may determine individual scores for each of the factors and then determine the overall score as an average of the scores. The scoring program 136 may then use the overall score relative to the scoring threshold to determine whether to distribute a specific attachment to a selected recipient. Accordingly, the scoring program 136 may generate and provide distribution information to the distribution program 132 so that the distribution program 132 properly transmits the email to the recipients and each recipient only receives appropriate attachments.

Figure 2:
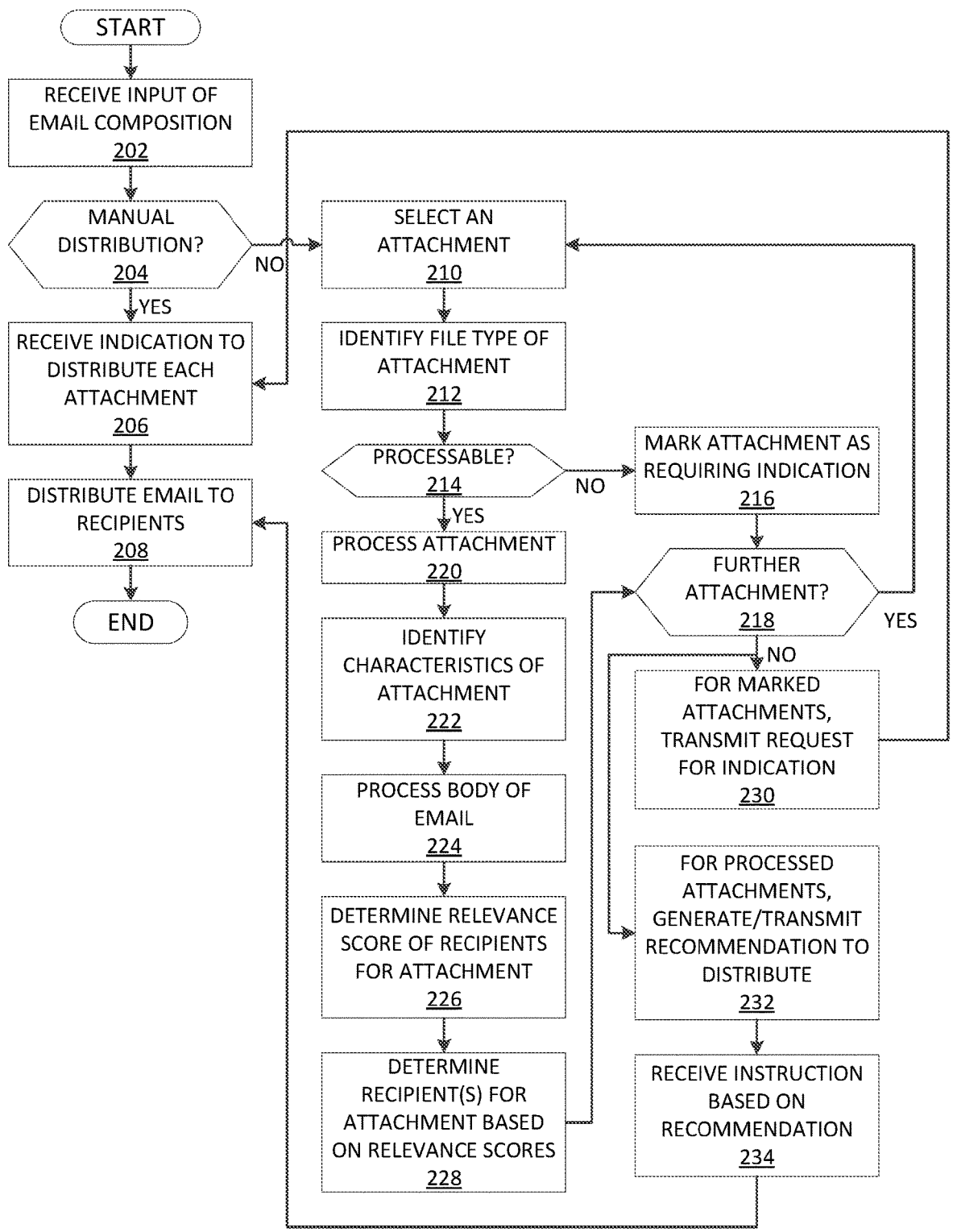
FIG. 2 depicts an exemplary flowchart of a method illustrating the operations of a distribution program 132, an identification program 134, and a scoring program 136 of the distribution server 130 of the attachment distribution system 100 in cognitively distributing email attachments to recipients, in accordance with the exemplary embodiments.

FIG. 2 illustrates an exemplary flowchart of a method 200 illustrating the operations of the distribution program 132, the identification program 134, and the scoring program 136 of the distribution server 130 of the attachment distribution system 100 in cognitively distributing email attachments to recipients, in accordance with the exemplary embodiments. The method 300 may relate to operations that are performed by the distribution program 132, the identification program 134, and the scoring program 136 subsequent to creating the email composition but prior to transmitting the email. The method 300 will be described from the perspective of the distribution server 130.

The distribution server 130 may receive an input of an email composition (step 202). Using the email client 112, the user who wishes to transmit an email to a plurality of recipients that may include one or more attachments may create the email composition by including a title, a list of the recipients, an email body, and the one or more attachments. Upon creating the email composition (e.g., while the email composition is being created, upon completion of creating the email composition, etc.), the distribution server 130 may receive the email composition for further processing.

To further illustrate the operations of the delegation program 134, reference is now made to an illustrative exemplary embodiment. According to the illustrative exemplary embodiment, the user may create the email composition that lists a plurality of recipients and include a plurality of attachments. The user may have entered the recipients using an email address book or entering email addresses of the recipients. The user may have also selected the attachments from various storage devices (e.g., an internal hard drive, a flash drive, etc.).

The distribution server 130 may determine whether the email is to be transmitted with the attachments selected through a manual selection process or an automated selection process (decision 204). As a result of the manual selection process being used in which the user provides each indication between an attachment and a recipient (decision 204, "YES" branch), the distribution server 130 receives distribution information including indications as to how to distribute the attachments (step 208). The user may be provided a feature via the email client 112 in which an attachment may prompt a response from the user as to whether a selected recipient is to receive the attachment. Based on each response, the email client 112 may generate the distribution information that is received by the distribution program 132. According to the distribution information, the distribution server 130 may distribute the email to the recipients such that each recipient receives the email (e.g., the title, the email body, etc.) but only receives the attachments that are indicated for that recipient.

According to the previously introduced exemplary embodiment, the user may have selected a setting that indicates that the user is to select the manner in which attachments of emails are to be distributed through a manual selection process. The setting may be associated with the email account such that each time multiple recipients and at least one attachment is present, the email client 112 may present a feature on the user interface for the user to provide each input. In an exemplary embodiment, the user may have selected three recipients and attached two files. The user interface may present a window in which an attachment is selected and present a list of the recipients. The user may then select which of the recipients are to receive the selected attachment. This process may continue for each attachment that has been included in the email composition. Thereafter, the distribution information based on the manual selections may be provided to the distribution program 132 for a corresponding transmission of the email and a corresponding distribution of the attachments.

As a result of the automated selection process being used in which the distribution server 130 determines the manner in which attachments are to be distributed to the recipients for attachments that may be processed (decision 204, "NO" branch), the distribution server 130 may select an attachment included in the email composition (step 210). The distribution server 130 may identify the file type of the attachment (step 212). There may be certain file types that may be processed for automatic selection according to the exemplary embodiments while other file types may not be processed in a sufficient manner. The file type may be indicative of whether the attachment may be processable although other criteria may also be used (e.g., file name). Thus, using the file type of the attachment, the distribution server 130 determines whether the attachment is processable (decision 214). As a result of the attachment being of a file type that is not processable (decision 214, "NO" branch), the distribution server 130 marks the attachment as requiring a manual selection (step 216). Thereafter, the distribution server 130 determines if there are any further attachments (decision 218). As a result of at least one further attachment being present (decision 218, "YES" branch), the distribution server 130 may select a further attachment and determine whether the attachment is processable. In this manner, these operations of the method 200 may be repeated for all the attachments to determine each attachment that is not processable. As a result of there being no further attachments (decision 218, "NO" branch), the distribution server 130 transmits a request to the user via the email client 112 to provide an indication as to the manner in which the marked attachments are to be distributed to the recipients (step 230). The distribution server 130 may receive the distribution information including the indications for each marked attachment (step 206).

With reference again to the previously introduced exemplary embodiment, the user may have selected a setting that indicates that the distribution server 130 is to perform the automated selection process. In an exemplary embodiment, the user may have selected three recipients and attached two files. In identifying the file types of the two files, a first file may be of a type that is not processable (e.g., zip, tar.gz, crt, pem, image, etc.) while the second file is of a type that is processable (e.g., doc, docx, txt, ppt, pdf, etc.). According to the above described operations of the method 200 for file types that are not processable, the first file may be marked as requiring an indication from the user. In an exemplary embodiment in which all attachments are first determined as being processable or not, the distribution server 130 may perform operations described below for the second file. With all attachments determined to be processable or not, the distribution server 130 may transmit to the user via the email client 112 to provide a manual selection as to how the first file is to be distributed to the three recipients.

As a result of the file type indicating the attachment is processable (decision 214, "YES" branch), the distribution server 130 may process the attachment (step 220). The distribution server 130 may process the attachment using a variety of mechanisms. For example, the distribution server 130 may be configured with NLP that prepares the attachment by segmenting text, performing tokenizing, removing stop words, doing part of speech tagging and chunking, etc. The distribution server 130 may determine a context of the attachment using NLP and machine learning techniques such as using NLP classifiers that are already trained on corresponding types of files. In this manner, the distribution server 130 may identify characteristics of the attachment (step 222). The distribution server 130 may also process the email body (step 224). Using the information ascertained from processing the attachments and the email body, the distribution server 130 may determine a score between the attachment and the recipients (step 226). In determining the score, the distribution server 130 may have received recipient information as determined by the identification program 134 that may be indicative of a variety of characteristics of the recipients. Through consideration of the information of the attachments and email body as well as the recipient information, the distribution server 130 may generate a score for each pairing of an attachment with a recipient. An expanded description of the manner in which the distribution server determines the score between the attachment and the recipients will be described in further detail below with regard to FIG. 3. Based on the scores, the distribution server 130 may determine which recipients are to have the selected attachment distributed (step 228). Thereafter, the distribution server 130 determines if there are any further attachments (decision 218) repeat for all the attachments to determine each attachment that is processable. As a result of there being no further attachments (decision 218, "NO" branch), the distribution server 130 generates and transmits a recommendation to the user of the determinations of which attachments are to be distributed to which recipients (step 232). The distribution server 130 may receive an instruction from the user based on the recommendation (step 234).

Referring now to the previously introduced, illustrative exemplary embodiment related to the automated selection process in which the user selected three recipients and attached two files where the second file is of a file type that is processable, the second file may have a recommendation determined as to which recipient is to have the attachment distributed. For example, the attachment may be an increment letter addressed to a first recipient. In processing the attachment, the identity of the first recipient may be determined. As the increment letter is personal to only the first recipient, the second and third recipients may have little to no relevance associated with the increment letter. In scoring the second file to each recipient, the distribution server 130 may utilize a score from 1 to 10 with a scoring threshold of 6. The distribution server 130 may determine a first score for the second file and the first recipient as 10 while a second score for the second file and the second or third recipient is only 1. Thus, the distribution server 130 may recommend that the second file only be distributed to the first recipient while omitted from the second and third recipients. The user may view this recommendation and agree and provide confirmation to proceed according to the recommendation.

Upon completing each attachment for the automated selection process, the distribution server 130 may distribute the email according to the distribution information which may be entirely from determinations made by the distribution server 130 or a combination with manual indications from the user when at least one attachment is not processable.

The exemplary embodiments may be configured to process file types that are otherwise generally categorized as not being processable. For example, as described above, the file name may provide insight as to how the attachment is to be distributed. In another example and as described above, the distribution server 130 may be configured with image processing techniques that allow for an image attachment to be processed for purposes of the exemplary embodiments. In a further example, compressed files (e.g., zip files) may also extract the individual one or more files included therein in temporary storage such that each file in the compressed file is analyzed in a manner consistent with the mechanism described above.

Figure 3:
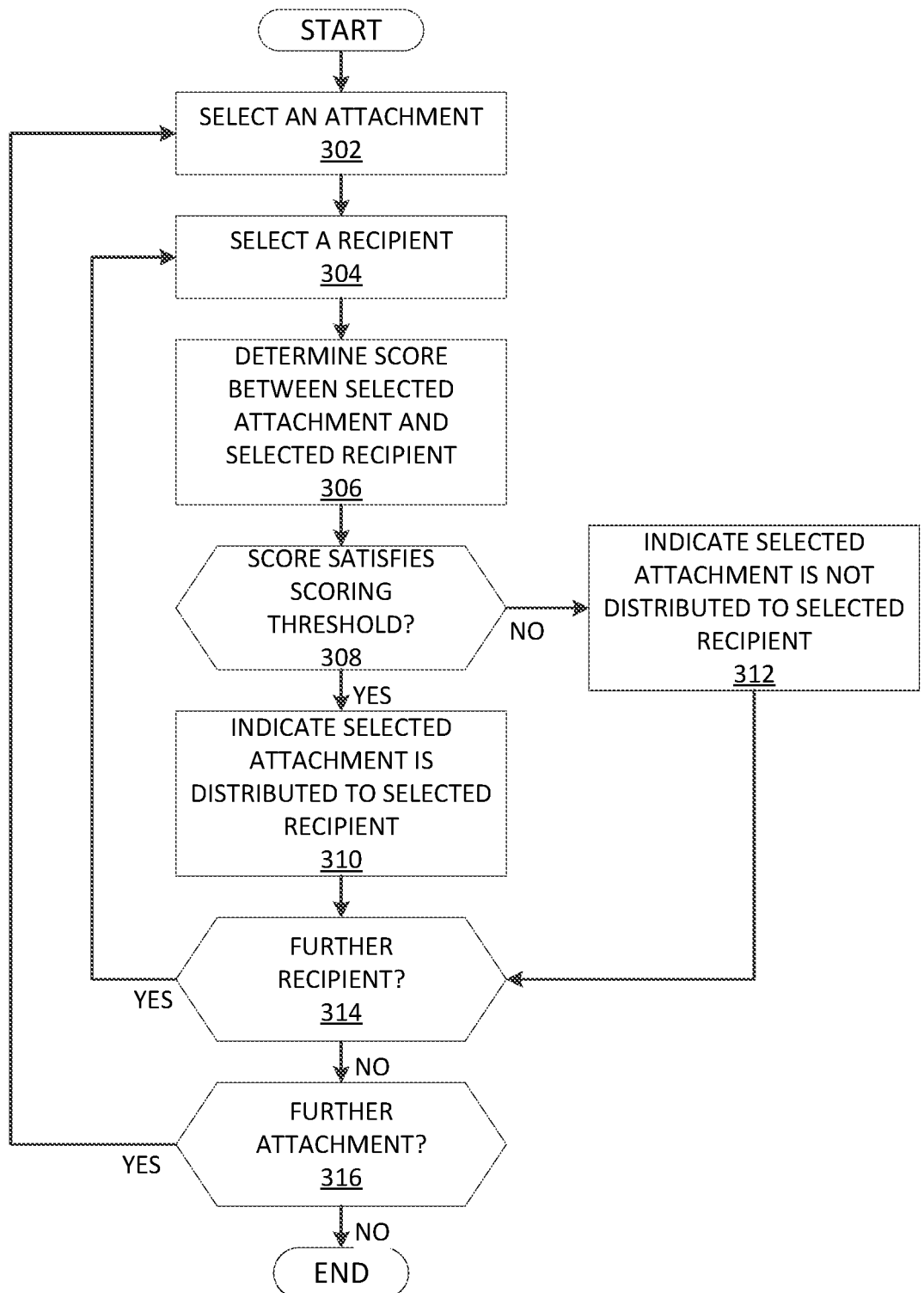
FIG. 3 depicts an exemplary flowchart of a method illustrating the operations of the scoring program 136 of the distribution server 130 of the attachment distribution system 100 in determining a score between a recipient and an attachment, in accordance with the exemplary embodiments.

FIG. 3 depicts an exemplary flowchart of a method 300 illustrating the operations of the scoring program 136 of the distribution server 130 of the attachment distribution system 100 in determining a score between a recipient and an attachment, in accordance with the exemplary embodiments.

The method 300 describes an expanded process of step 226 that may be used for an analysis between each recipient and each attachment. The method 300 is also described with regard to processing an attachment relative to the recipients. However, the method 300 may be modified to process a recipient relative to the one or more attachments.

The scoring program 136 may select an attachment (step 302). For the selected attachment, the scoring program 136 may select a recipient among the recipients listed in the email composition as well as any potential unlisted recipient (step 304). For the selected attachment and the selected recipient, the scoring program 136 may determine a score (step 306). As described above, the scoring program 136 may process the email composition and the selected attachment. The scoring program 136 may use NLP techniques in determining a type of attachment, a context of the attachment, a purpose of the email, a context of the email body, etc. The scoring program 136 may also use the profile 122 corresponding to the selected recipient. In considering the characteristics and information of the attachment, the email, and the recipient, the scoring program 136 may determine the score based on a variety of factors with regard to an appropriateness that the selected recipient is to have the selected attachment distributed. For example, the scoring program 136 may utilize a timing factor, an authorization factor, a relevance or appropriateness factor based on the characteristics of the selected recipient relative to the context of the selected attachment, an interest factor of the selected recipient of the context of the selected attachment, etc. The scoring program 136 may utilize one or more of these factors in determining the score between the selected attachment and the selected recipient. For example, the scoring program 136 may utilize an overall score by determining an individual score for each factor and determining the overall score as an average of the individual scores.

The scoring program 136 may determine whether the score between the selected attachment and the selected recipient satisfies a scoring threshold (decision 308). For example, the scores may range in values from 1 to 10 where 1 is indicative of a lowest relevance and 10 is indicative of a highest relevance. As a result of the score between the selected attachment and the selected recipient satisfying the scoring threshold (decision 308, "YES" branch), the scoring program 136 may indicate that the selected attachment is to be distributed to the selected recipient (step 310). As a result of the score between the selected attachment and the selected recipient not satisfying the scoring threshold (decision 308, "NO" branch), the scoring program 136 may indicate that the selected attachment is not to be distributed to the selected recipient (step 312).

Upon processing whether the selected attachment is to be distributed to the selected recipient, the scoring program 136 may determine whether there is at least one further recipient (decision 314). As a result of there being at least one further recipient to be processed (decision 314, "YES" branch), the scoring program 136 may select another recipient (step 304) and continue the analysis until all recipients have been processed for the selected attachment. As a result of all the recipients being processed for the selected attachment (decision 314, "NO" branch), the scoring program 136 may determine whether there is at least one further attachment (decision 316). As a result of there being at least one further attachment to be processed (decision 316, "YES" branch), the scoring program 136 may select another attachment (step 302) and continue the analysis until all attachments have been processed for the email. As a result of all the attachments being processed for the email (decision 316, "NO" branch), the distribution server 130 may generate distribution information that is used in transmitting the email to the recipients where each recipient is only distributed the attachments that are determined to be appropriate or relevant.

The exemplary embodiments are configured to cognitively distribute email attachments to recipients. The exemplary embodiments may utilize a manual selection process if so selected by the user and/or for attachments that are not properly processable when using an automated selection process. The exemplary embodiments may also utilize the automated selection process for attachments that may be processed for purposes of the exemplary embodiments. Through an analysis of the attachment, the email body, and the recipients, the exemplary embodiments may score a relevance or appropriateness according to various parameters and determine whether a particular recipient is to have a specific attachment distributed.

Figure 4:
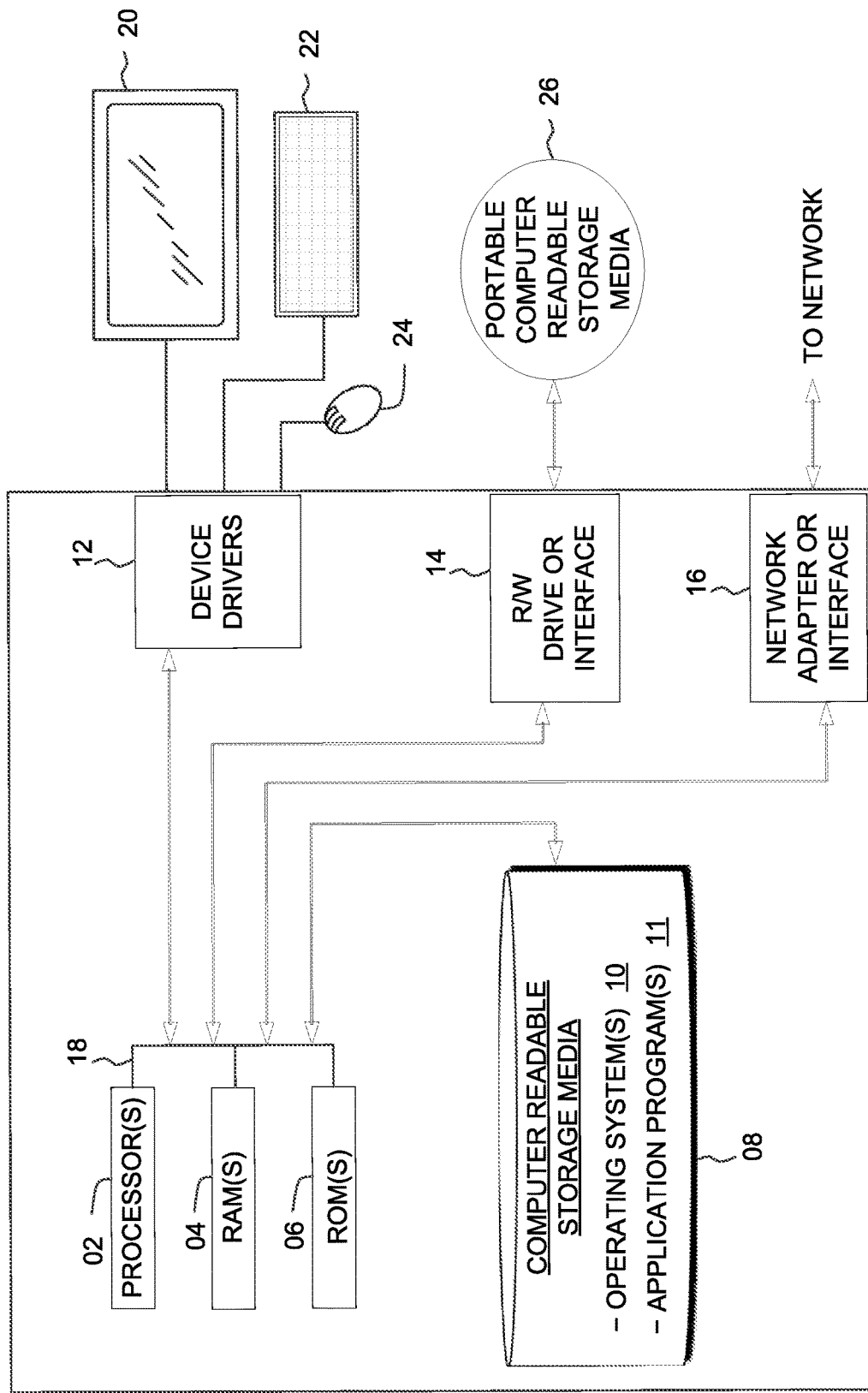
FIG. 4 depicts an exemplary block diagram depicting the hardware components of the attachment distribution system 100 of FIG. 1, in accordance with the exemplary embodiments.

FIG. 4 depicts a block diagram of devices within the attachment distribution system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
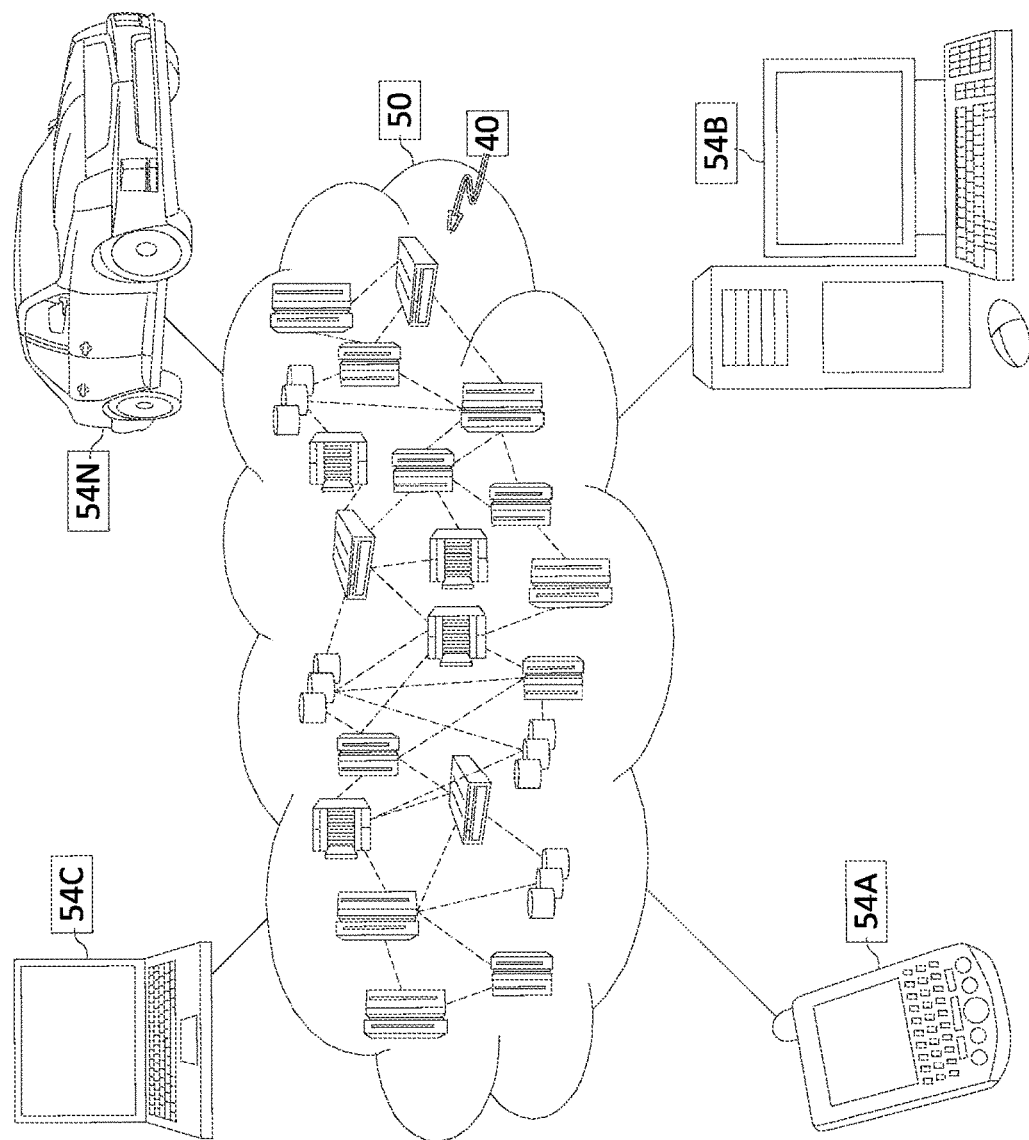
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
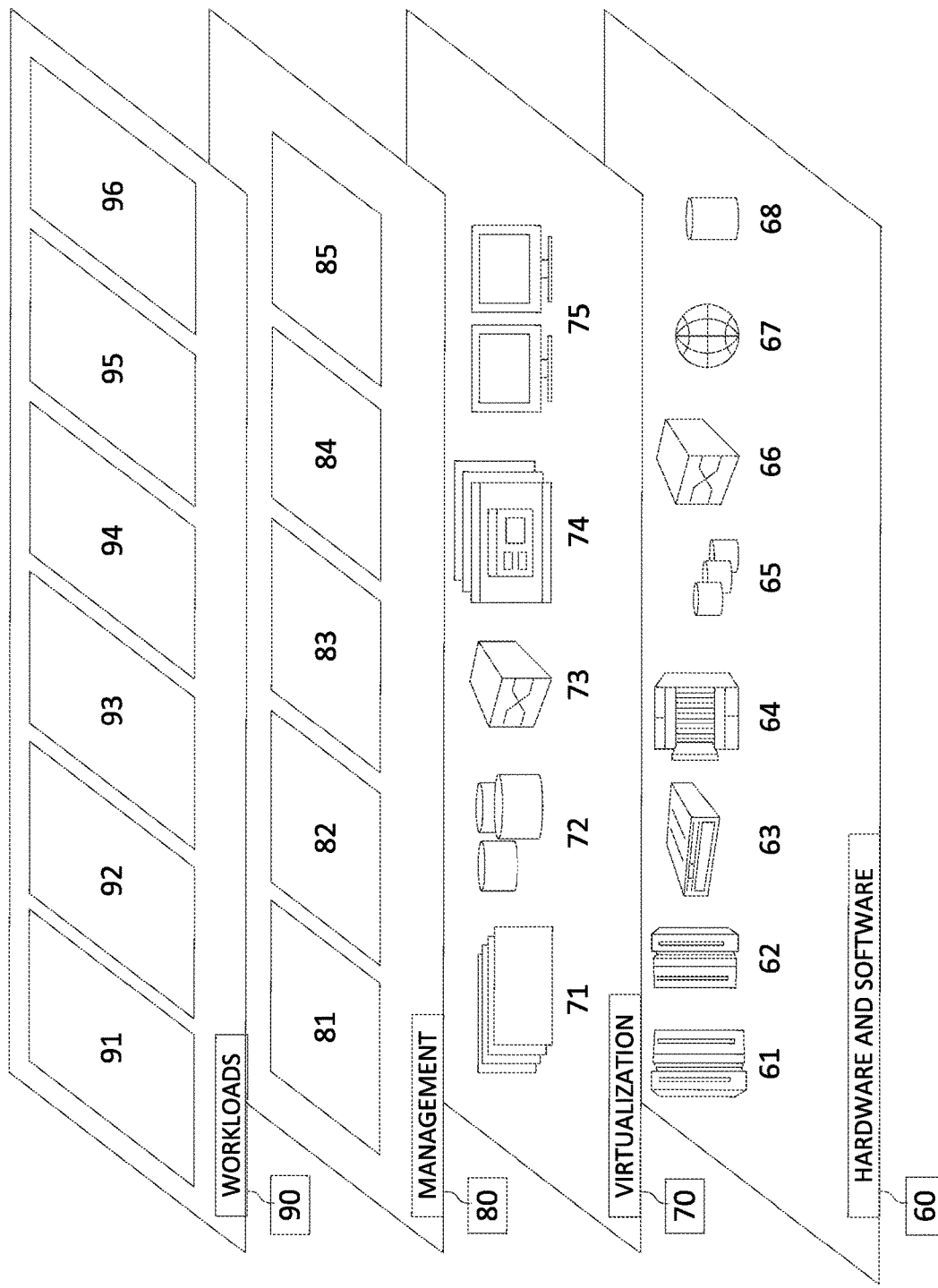
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distribution processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method, the method comprising:
   receiving, by a distribution server, email addresses corresponding to recipients, the email addresses associated with one of a simple mail transfer protocol (SMTP) server or an Internet message access protocol (IMAP) server configured to route inbound emails to the recipients;
   receiving, by the distribution server, an email composition for an email to be transmitted to the recipients, the email composition including at least one attachment;
   determining, by the distribution server, recipient information indicative of respective characteristics of the recipients;
   determining, by the distribution server, a context of a select one of the at least one attachment;
   for each recipient, determining, by the distribution server, a score indicative of an appropriateness of the selected attachment being distributed to the recipient based on the recipient information of the recipient and the context of the selected attachment;
   as a result of the score for a select one of the recipients satisfying a scoring threshold, generating, by the distribution server, a recommendation corresponding to the result of the score relative to the scoring threshold for the selected attachment and the selected recipient that is provided to a user creating the email composition; and
   as a result of receiving a confirmation for the recommendation from the user, distributing, by the distribution server, the attachment to the selected recipient via the email and the one of the SMTP server or the IMAP server, such that the attachment is cognitively distributed among the recipients.

2. The computer-implemented method of claim 1, further comprising:
   identifying a file type of the selected attachment,
   wherein the score is determined for the selected attachment as a result of the file type being predefined as configured to be processed by a subsequent operation.

3. The computer-implemented method of claim 1, wherein the context of the selected attachment is determined using natural language processing (NLP) classifiers.

4. The computer-implemented method of claim 1, wherein the characteristics comprise an expertise, a knowledge, a coursework, an interest, or a combination thereof.

5. The computer-implemented method of claim 1, wherein the score indicative of the appropriateness is based on a timing, an authorization, or a combination thereof.

6. The computer-implemented method of claim 1, wherein the email composition further includes an email body included in the email for the recipients, wherein the method further comprises:
   determining a further context of the email body,
   wherein the score is determined further based on the further context.

7. A
   non-transitory computer-readable storage media that configures a computer to perform program instructions stored on the non-transitory computer-readable storage media, the program instructions comprising:
   receiving, by a distribution server, email addresses corresponding to recipients, the email addresses associated with one of a simple mail transfer protocol (SMTP) server or an Internet message access protocol (IMAP) server configured to route inbound emails to the recipients;
   receiving, by the distribution server, an email composition for an email to be transmitted to the recipients, the email composition including at least one attachment;
   determining, by the distribution server, recipient information indicative of respective characteristics of the recipients;

determining, by the distribution server, a context of a select one of the at least one attachment;

for each recipient, determining, by the distribution server, a score indicative of an appropriateness of the selected attachment being distributed to the recipient based on the recipient information of the recipient and the context of the selected attachment;

as a result of the score for a select one of the recipients satisfying a scoring threshold, generating, by the distribution server, a recommendation corresponding to the result of the score relative to the scoring threshold for the selected attachment and the selected recipient that is provided to a user creating the email composition; and as a result of receiving a confirmation for the recommendation from the user, distributing, by the distribution server, the attachment to the selected recipient via the email and the one of the SMTP server or the IMAP server, such that the attachment is cognitively distributed among the recipients.

8. The non-transitory computer-readable storage media of claim 7, wherein the program instructions further comprise:
identifying a file type of the selected attachment,
wherein the score is determined for the selected attachment as a result of the file type being predefined as configured to be processed by a subsequent operation.

9. The non-transitory computer-readable storage media of claim 7, wherein the context of the selected attachment is determined using natural language processing (NLP) classifiers.

10. The non-transitory computer-readable storage media of claim 7, wherein the characteristics comprise an expertise, a knowledge, a coursework, an interest, or a combination thereof.

11. The non-transitory computer-readable storage media of claim 7, wherein the score indicative of the appropriateness is based on a timing, an authorization, or a combination thereof.

12. The non-transitory computer-readable storage media of claim 7, wherein the email composition further includes an email body included in the email for the recipients, wherein the program instructions further comprise:
determining a further context of the email body,
wherein the score is determined further based on the further context.

13. A computer system, the computer system comprising:
one or more computer processors, one or more computer-readable storage media, and program instructions stored on the one or more of the computer-readable storage media for execution by at least one of the one or more processors capable of performing a method, the method comprising:

receiving, by a distribution server, email addresses corresponding to recipients, the email addresses associated with one of a simple mail transfer protocol (SMTP) server or an Internet message access protocol (IMAP) server configured to route inbound emails to the recipients;

receiving, by the distribution server, an email composition for an email to be transmitted to the recipients, the email composition including at least one attachment;

determining, by the distribution server, recipient information indicative of respective characteristics of the recipients;

determining, by the distribution server, a context of a select one of the at least one attachment;

for each recipient, determining, by the distribution server, a score indicative of an appropriateness of the selected attachment being distributed to the recipient based on the recipient information of the recipient and the context of the selected attachment;

as a result of the score for a select one of the recipients satisfying a scoring threshold, generating, by the distribution server, a recommendation corresponding to the result of the score relative to the scoring threshold for the selected attachment and the selected recipient that is provided to a user creating the email composition; and as a result of receiving a confirmation for the recommendation from the user, distributing, by the distribution server, the attachment to the selected recipient via the email and the one of the SMTP server or the IMAP server, such that the attachment is cognitively distributed among the recipients.

14. The computer system of claim 13, wherein the method further comprises:
identifying a file type of the selected attachment,
wherein the score is determined for the selected attachment as a result of the file type being predefined as configured to be processed by a subsequent operation.

15. The computer system of claim 13, wherein the context of the selected attachment is determined using natural language processing (NLP) classifiers.

16. The computer system of claim 13, wherein the characteristics comprise an expertise, a knowledge, a coursework, an interest, or a combination thereof.

17. The computer system of claim 13, wherein the score indicative of the appropriateness is based on a timing, an authorization, or a combination thereof.

* * * * *